Dec. 8, 1970      M. G. BABBERL      3,545,113
DISPLAY DEVICE
Filed March 7, 1968
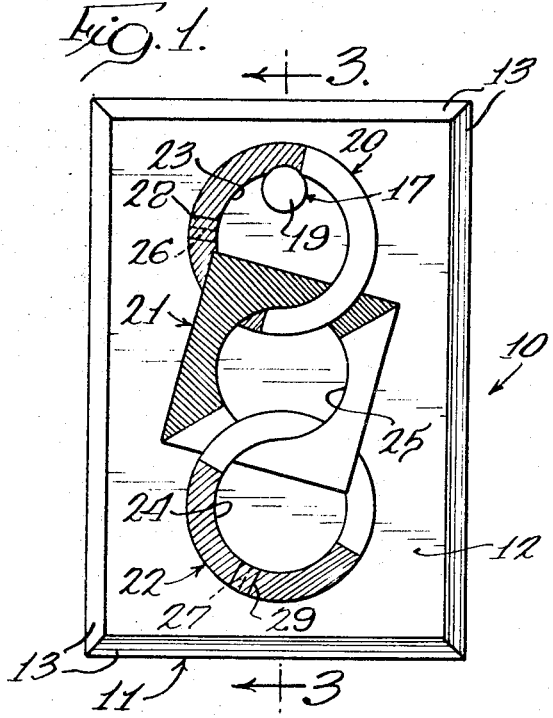
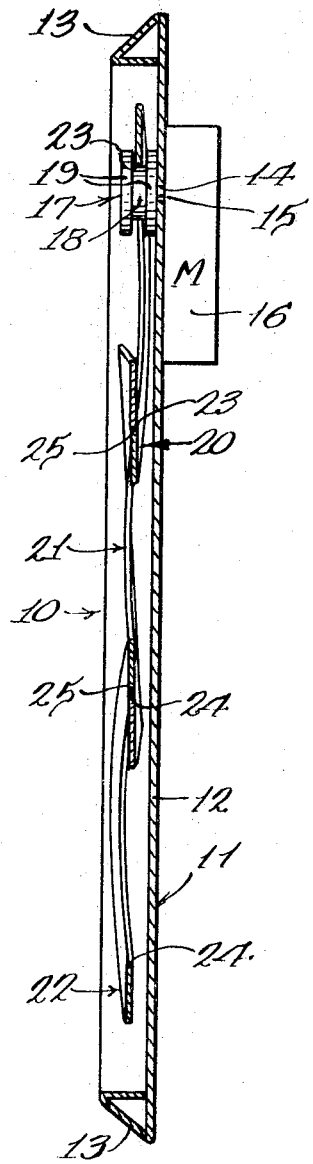
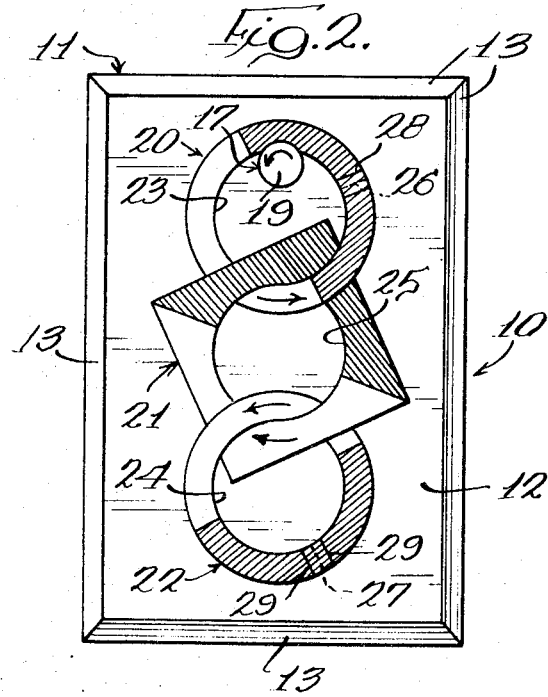
Inventor
Marian G. Babberl
By Hofgren, Wegner,
Allen, Stellman & McCord
Attys

United States Patent Office 3,545,113
Patented Dec. 8, 1970

3,545,113
DISPLAY DEVICE
Marion G. Babberl, Harvey, Ill., assignor to Rapid Mounting and Finishing Company, a corporation of Illinois
Filed Mar. 7, 1968, Ser. No. 711,361
Int. Cl. G09f *19/00*
U.S. Cl. 40—106.41    4 Claims

ABSTRACT OF THE DISCLOSURE

A display device consisting of a plurality of interleaved display members, each display member having a circumferentially continuous circular drive surface frictionally engaging the drive surface on an adjacent display member, so that when the uppermost display member is rotated, each of the other display members will also be rotated. The uppermost display member is preferably suspended upon a frictional driving member coupled with a display motor.

BACKGROUND OF THE INVENTION

This invention relates in general to a display device, and more particularly to an animated display device wherein a plurality of movable display members are provided. Animated display devices are in common usage in commercial establishments and their primary function is to catch the eye of a potential customer and draw his attention to an advertising message relating to a particular product. While many different types of animated display devices have been provided in the past, heretofore a simple and inexpensive display device wherein the display members can be readily removed and replaced to change the nature of the display has not been provided. Furthermore, known types of animated display devices have utilized a mechanical type of coupling between a prime mover and the various movable display members to move the display members relative to one another.

SUMMARY

The display device of the present invention obviates the problems noted above by providing a novel arrangement which eliminates the need for providing direct mechanical coupling between a prime mover and the various display members of an animated display device. More particularly, the display device of the present invention includes a plurality of interleaved display members which are arranged so that only one of the display members need be positively driven, with each of the other display members being driven by friction from the movement of the first display member. Furthermore, the display device of the present invention is arranged so that the display members can be readily removed and replaced to change the character of the display, when desired.

BRIEF DESCRIPTION OF THE DRAWING

FIG. 1 is a front elevational view of a preferred embodiment of the display device of the present invention, and illustrating the display members in a first position;

FIG. 2 is a view similar to FIG. 1, but illustrating the display members in a second position; and FIG. 3 is an enlarged sectional view taken generally along line 2—2 of FIG. 1.

DESCRIPTION OF THE PREFERRED EMBODIMENT

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

The illustrated embodiment of the display device of the present invention is indicated generally at 10 in the drawing, and the display device 10 includes a housing structure 11 that is carried by a suitable support, not shown. Housing structure 11 includes an upright, generally rectangularly shaped member 12 having a border 13 formed by inwardly bent peripheral portions of the upright member 12. An opening 14 is provided at the upper central portion of member 12, and the output shaft 15 of a conventional display motor 16 extends forwardly of member 12 through opening 14, with the display motor 16 being carried by suitable support structure, not shown.

A drive member 17 is mounted upon the output shaft 15 of motor 16 for rotation therewith, and drive member 17 includes a central cylindrical hub 18, with enlarged flanges 19 being provided at opposite ends of hub 18. Drive member 17 and particularly the hub 18 thereof, is formed of a suitable material having a high coefficient of friction with respect to the material of the display member that is driven thereby, as will hereafter appear. As is clear from FIG. 3, the rear face of the rear flange 19 of drive member 17 is positioned adjacent the forward face of upright member 12, with the surface of hub 18 being disposed outwardly of the front surface of upright member 12 and at right angles with respect thereto.

The display device 10 includes a plurality of interleaved display members, three being shown in the illustrated embodiment, reference numeral 20 designating the uppermost display member, and reference numerals 21 and 22 designating the intermediate and lowermost display members, respectively. In the illustrated embodiment, display members 20 and 22 are generally identically shaped annular members having respective circumferentially continuous circular drive transmitting surfaces 23 and 24. Intermediate display member 21 differs from upper display member 20 and lower display member 22 essentially in that it is square in external configuration, although display member 21 also includes a circumferentially continuous circular drive transmitting surface 25 having the same diameter as the drive surfaces 23 and 24 of display members 20 and 22, respectively. While the illustrated display device includes two identical display members and one display member having a different external configuration, it should be understood that the external configuration of the display members can be the same or different depending on the desired display effect; and furthermore, the openings in the various display members can be of different size, so long as the external perimeter of one display member does not interfere with an adjacent display member. It should also be understood that the rotational speed of the various display members varies in accordance with the diameter of the drive transmitting surfaces, so that the display member can rotate at different speeds, if desired.

At least one of the display members is severed, so that all of the display members can be interleaved with one another, and to this end, in the illustrated display device embodiment, display members 20 and 22 are provided with radial cuts 26 and 27, respectively, with transparent means, such as Scotch tape or the like, being provided over the cuts as illustrated at 28 and 29 to secure the facing ends of the display members to one another. In preferred embodiments having three or more display members, the preferred arrangement is to have the second, fourth, sixth, etc. display members severed. Various different means can be used to secure the severed display member ends together, and for purposes of example and not of limitation, a laminated strip may be secured across the severed ends, or the severed end may be joined by transparent tape or solid materials, by heat and/or pressure, or by appropriate chemical treatment.

As is evident from FIG. 2, display members 20–22 are formed from thin, flat stock, which allows a substantial portion of the display members to be positioned in face opposed relationship with the outer surface of upright member 12, with the upright member 12 serving to partially support the display members and guide them as they are rotated. The display devices 20–22 have a thickness slightly less than the distance between the flanges 19 on the drive roller 17, and the display members are preferably formed of a material, such as cardboard, which has rigidity to elongation and a relatively high coefficient of friction with respect to the drive wheel 17 (which is preferably formed of a suitable rubber or plastic material). Display member 21 is freely suspended from display member 20, with the surface 23 on display member 20, being in frictional, drive transmitting engagement with the surface 25 on the display member 21; and in a like manner, display member 22 is freely suspended from display member 21, with the surface 25 on display member 21 being in frictional, drive transmitting relationship with respect to the surface 24 on display member 22.

Thus, when the motor 16 is energized to rotate the output shaft 15 and the drive member 17 in a counterclockwise direction, as viewed in FIG. 2, display member 20 is rotated in a counterclockwise direction through the frictional engagement between the hub 18 on drive member 17 and the circular surface 23 on display member 20. The frictional engagement between the surface 23 on display member 20 and surface 25 on display member 21 causes the display member 21 to rotate in an opposite or clockwise direction, while the frictional engagement between the surface 25 on display member 21 and the surface 24 on the display member 22 causes the display member 22 to be rotated in a counterclockwise direction. To increase the visual effectiveness of the display, the exposed surfaces of the display members preferably each have areas of contrasting colors, as is evident from FIG. 1. The forwardly facing surface of upright member 12 may also be formed of a contrasting color. In view of the fact that the upper display member 20 is freely suspended upon drive member 17, it will be readily appreciated that the display members can be readily removed and replaced with further display members when desired. Furthermore, the single drive member 17 functions to move all of the display members, although it is only directly associated with one of the display members. While three display members have been shown in the illustrated embodiment, it will be readily understood that two or more display members may be used where appropriate.

I claim:
1. A display device comprising: first and second display members, each display member comprising a thin flat geometric figure having a cut-out portion forming a substantially circular internal drive surface; the display members being interleaved with each other so that said drive surfaces are in cooperative contact and the second display member is vertically suspended from the first display member; means for supporting said first display member for rotation; means for maintaining the interleaved members in substantially coplanar relationship; and means for rotating said first display member and, through frictional engagement between said drive surfaces, rotating said second display member.

2. A display device as set forth in claim 1 wherein said means for rotating said first display member includes driven means engaging the drive surface of the first display member.

3. A display device as set forth in claim 2 wherein said first display member is suspended upon said driven means, so that said driven means engages said first display member at a point generally diametrically opposite from said second display member.

4. A display device as set forth in claim 1 wherein said display device includes an upright support member and said display members are thin and flat, and are positioned immediately forwardly of said upright support member.

References Cited
UNITED STATES PATENTS 2,977,699    4/1961    Lofton    40—106.3
3,086,315    4/1963    Fasano    46—51 X EUGENE R. CAPOZIO, Primary Examiner L. R. OREMLAND, Assistant Examiner U.S. Cl. X.R.
40—28